(12) United States Patent
Chan et al.

(10) Patent No.: US 9,569,830 B2
(45) Date of Patent: Feb. 14, 2017

(54) IMAGE PROCESSING METHOD AND ELECTRONIC APPARATUS WITH IMAGE PROCESSING MECHANISM

(71) Applicant: MEDIATEK INC., Hsin-Chu (TW)

(72) Inventors: Cheng-Che Chan, Hsinchu County (TW); Cheng-Che Chen, New Taipei (TW); Ding-Yun Chen, Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 14/791,273

(22) Filed: Jul. 3, 2015

(65) Prior Publication Data

US 2017/0004608 A1    Jan. 5, 2017

(51) Int. Cl.
  *G06K 9/36* (2006.01)
  *G06T 5/50* (2006.01)
  *G06T 7/00* (2006.01)
  *G06T 3/40* (2006.01)

(52) U.S. Cl.
  CPC . *G06T 5/50* (2013.01); *G06T 3/40* (2013.01); *G06T 7/0065* (2013.01)

(58) Field of Classification Search
  USPC ...... 382/284, 191, 162; 340/854.8; 345/420, 345/421, 422, 629; 379/55.1; 455/41.1; 715/213, 220
  See application file for complete search history.

(56) References Cited

U.S. PATENT DOCUMENTS

| | | | | |
|---|---|---|---|---|
| 5,339,386 A | * | 8/1994 | Sodenberg | G06T 15/503 345/420 |
| 7,797,621 B1 | * | 9/2010 | Danner | G06F 17/246 715/220 |
| 7,814,407 B1 | * | 10/2010 | Danner | G06F 17/246 715/213 |
| 7,986,916 B2 | * | 7/2011 | Williams | G06K 7/0008 340/854.8 |
| 8,213,711 B2 | * | 7/2012 | Tam | G06T 7/0051 382/162 |

* cited by examiner

*Primary Examiner* — Anh Do
(74) *Attorney, Agent, or Firm* — Han IP Corporation; Andy M. Han (57) ABSTRACT

An image processing method comprising: (a) acquiring a first depth value for a first object in a first image; and (b) altering image effect for the first object according the first depth value when the first object is pasted onto a second image.

20 Claims, 11 Drawing Sheets

IMAGE PROCESSING METHOD AND ELECTRONIC APPARATUS WITH IMAGE PROCESSING MECHANISM

BACKGROUND

The present disclosure relates to an image processing method and an electronic apparatus with an image processing mechanism, and particularly relates to an image processing method and an electronic apparatus which can automatically process an image according to depth values.

Sometimes, a user may desire to alter an image after the image is captured. For example, the user wants to paste his image to an image for a place he has never been. Alternatively, the user may want to paste an image for a furniture to an image of a room to see if the furniture matches that room.

However, many altering steps are needed to complete this altering process. Firstly, the user must copy his image and paste his image to the image he wants. Secondly, the user must alter the location and the size for his image manually. However, the user may forget the real distance and the real size for the objects in the image he wants. Accordingly, the image after altered may be weird.

Figure 1:
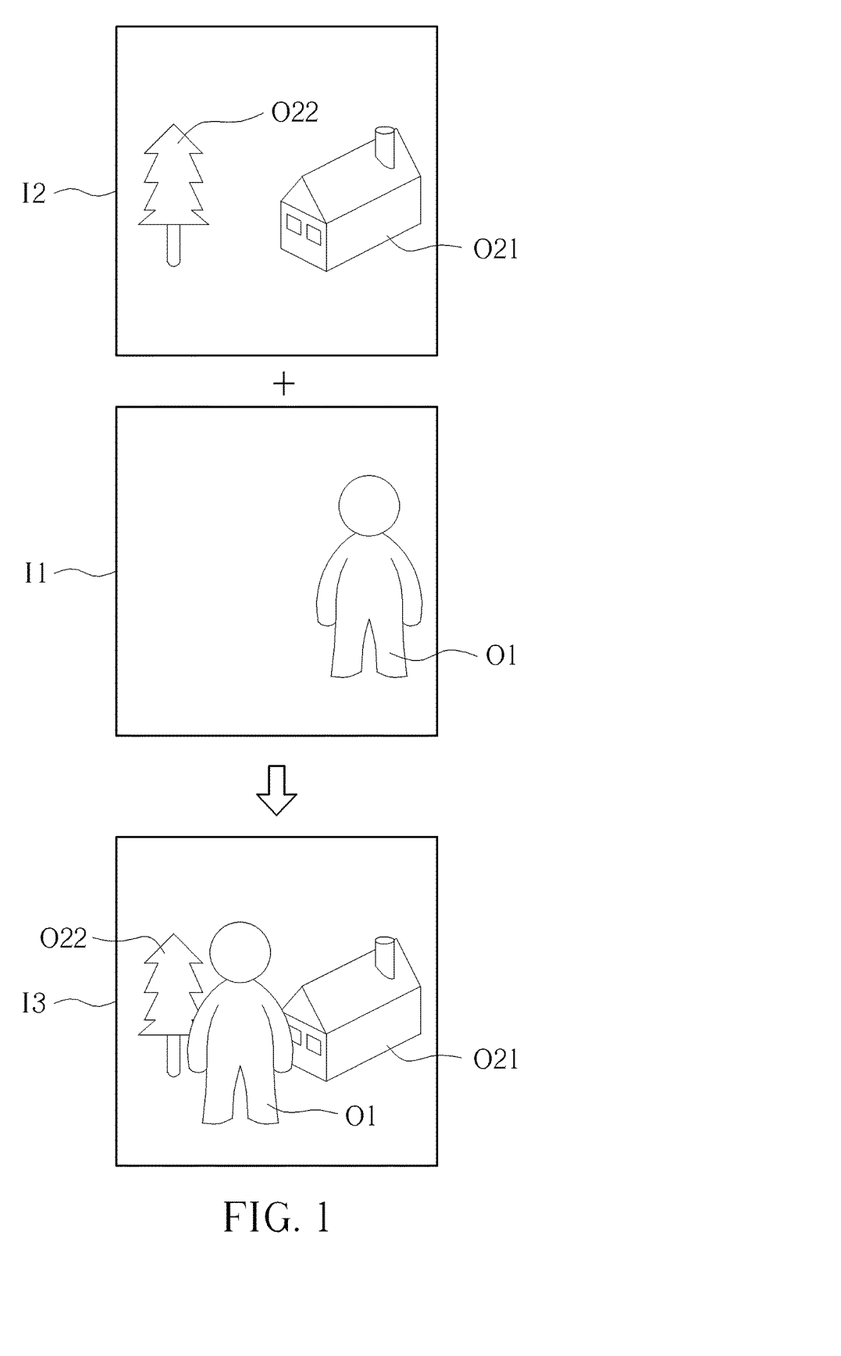
FIG. 1 is a schematic diagram illustrating a conventional image altering method.

Take FIG. 1 for example, which is a schematic diagram illustrating a conventional image altering method, the user pastes the first object O1 (i.e. the user's image) in the first image I1 onto the second image I2 which comprises an image for a house (the second object O21) and an image for a tree (the second object O22), to generate an image I3. However, the first object O1 is large since the camera is near the people while shooting a photo, and the second objects O21 and O22 are small since the camera is far from the house and the tree while shooting a photo. Therefore, if the user does not alter the size of first object Ob1 after pasting the first object Ob1 onto the second image I2, the third image I3 will be weird. However, the user may not know what are the most suitable size and location for the first object O1 in the second image I2.

SUMMARY

One objective of the present disclosure is to provide an image processing method to automatically alter the object to be pasted.

One objective of the present disclosure is to provide an electronic apparatus to automatically alter the object to be pasted.

One implementation of the present disclosure discloses an image processing method comprising: (a) acquiring a first depth value for a first object in a first image; and (b) altering image effect for the first object according the first depth value when the first object is pasted onto a second image.

Another implementation of the present disclosure discloses an electronic apparatus with an image processing mechanism comprising: a depth detecting device, configured to acquire a first depth value for a first object in a first image; and an image processing device, configured to alter image effect for the first object according the first depth value when the first object is pasted onto a second image.

In view of above-mentioned implementations, the image effect of the object to be pasted can be automatically altered based on the depth value of the object to be pasted. Accordingly, the images can be merged with less disharmony. Also, optimized location and size for the object can be acquired.

These and other objectives of the present disclosure will no doubt become obvious to those of ordinary skill in the art after reading the following detailed description of the preferred implementation that is illustrated in the various figures and drawings.

DETAILED DESCRIPTION

Figure 2:
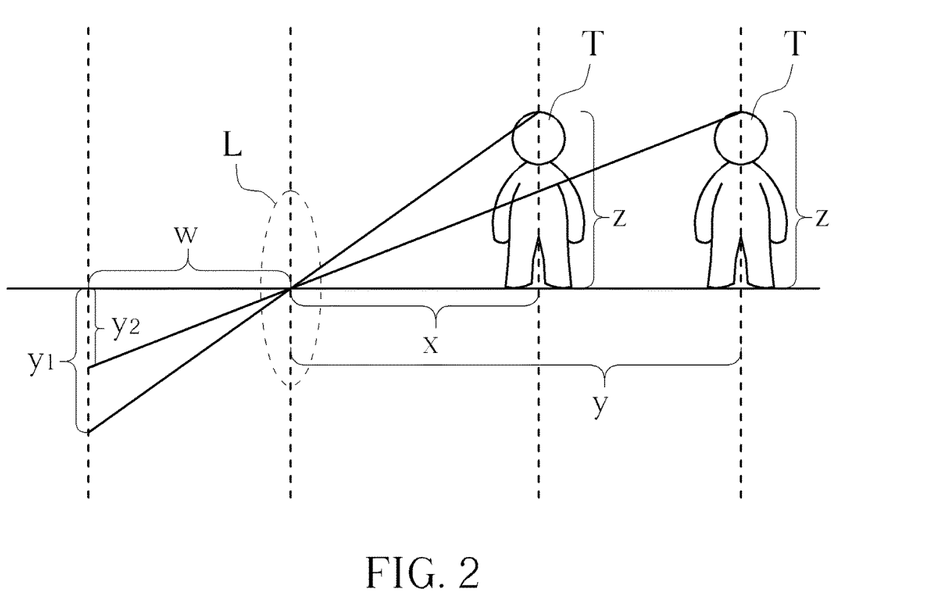
FIG. 2 is a schematic diagram illustrating relations between real sizes for targets, distances for the targets, sizes for images of targets, and distances for images of targets.

FIG. 2 is a schematic diagram illustrating relations between real sizes for targets, distances for the targets, sizes for images of targets, and distances for images of targets. Based on FIG. 2, the Equations (1)-(3) can be acquired:

$$\frac{z}{x} = \frac{y_1}{w} \qquad \text{Equation (1)}$$

$$\frac{z}{y} = \frac{y_2}{w} \qquad \text{Equation (2)}$$

$$y_2 = \frac{z}{y}w = \frac{x}{y}y_1 \qquad \text{Equation (3)}$$

The z is a real size of the target T, and x, y are distances between the camera lens L and the target T while T is at different locations. Further, w is the distance between the image sensor and the camera lens L. Besides, $y_1$ and $y_2$ are image sizes for the target T (i.e. the objects in following description) while the target T is at different locations. Based on above-mentioned equations, if x, y are acquired, the ratio between $y_1$ and $y_2$ can be acquired as well. The following implementations depicted in FIG. 3-FIG. 6 can be implemented based on the equations (1)-(3), but not limited.

Figure 3:
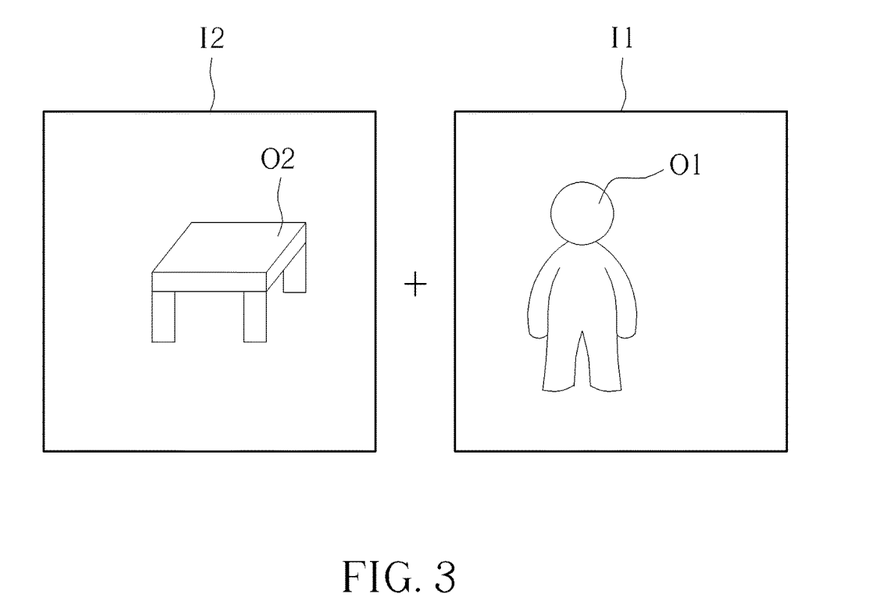
FIG. 3-FIG. 8 are schematic diagrams illustrating image processing methods according to different implementations of the present disclosure.
Figure 4:
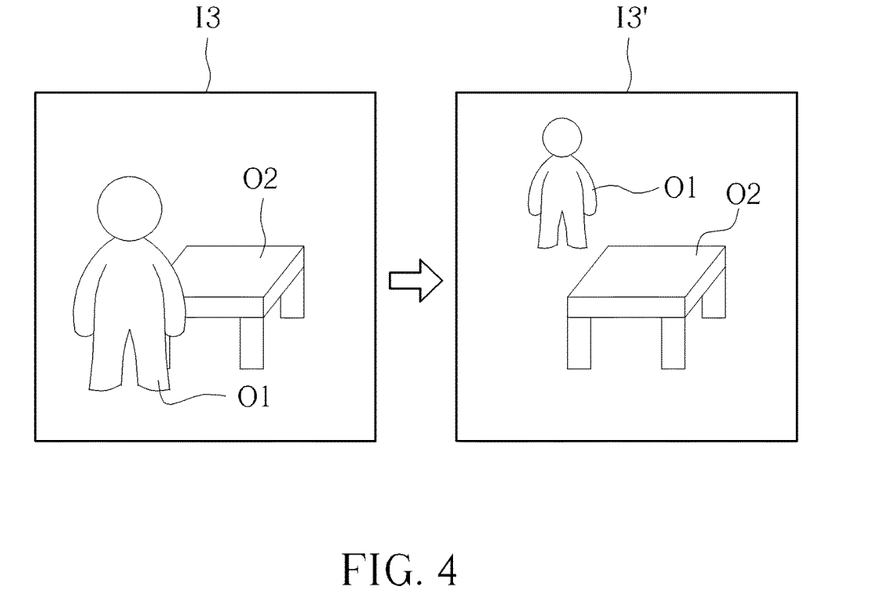

Please refer to FIG. 3 and FIG. 4, which are schematic diagrams illustrating an image processing method according to one implementation of the present disclosure. As shown in FIG. 3, the first image I1 comprises a first object O1 (in this implementation, a person's image) and the second image I2 comprises a second object O2 (in this implementation, a desk's image). In the implementations of FIG. 3 and FIG. 4, the first object O1 will be copied (or cut out) and pasted onto the second image I2. As shown in FIG. 4, if the first object O1 is pasted following a conventional method, the size of the first object O1 will be remained the same, as shown in the third image I3 in FIG. 4.

However, in one implementation of the present disclosure, the depth values (ex. depth map) for the first image I1 and the second image I2 are acquired, and the size and the location for the first object O1 are altered according to the depth value of the first object O1. Take FIG. 4 for example, the first object O1 has a depth value of 100 cm and the second object O2 has a depth value of 50 cm. Therefore, the location of the first object O1 in the second image I2 is supposed to fall behind the second object O2. Also, the size of the first object O1 can be acquired according to above-mentioned Equations (1)-(3). Accordingly, the location and the size for the first object O1 in the third image I3 are automatically altered, thereby an altered third image I3' is generated. Please note, the third image I3 illustrated in FIG. 4 is only for the convenience of explaining, thus the third image I3 may not appear and the user directly acquires the altered third image I3' after pastes the first object O1 from the first image I1 to the second image I2.

Please note, the first object O1 in the altered third image I3' of FIG. 4 is not covered by the second object O2 since it locates far behind the second object O2. However, if the first object O1 falls behind the second object O2 but is close to the second object O2, the first object O1 may be partially covered by the second object O2, as depicted in FIG. 5.

In one implementation, after the steps for automatically altering the size and location of the first object O1 according to the depth value thereof, the user can further move the first object to another location. In such implementation, the first object O1 is enlarged when the first object O1 is moved from the location in the altered third image I3' of FIG. 4 to a second location with a depth value smaller than the depth value in the first image I1. Also, the first object is shrunk when the first object O1 is moved from the location in the altered third image I3' of FIG. 4 to a second location with a depth value larger than the depth value in the first image I1.

Figure 5:
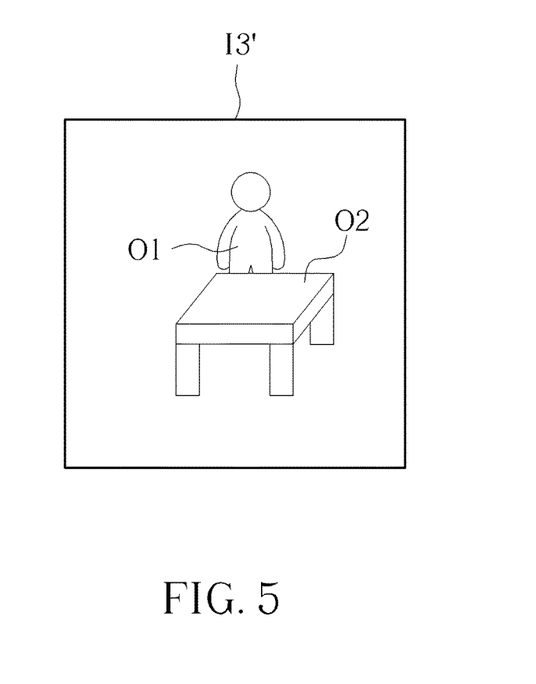

The steps for the implementations of FIG. 3-FIG. 5 can be summarized as: the depth value for the first object O1 is merged into the second image I2 while the first object O1 is pasted from the first image I1 to the second image I2. After that, the location with the first depth value in the second image I2 is acquired and the first object O1 is provided at this location in the second image I2. Further, the first object O1 is resized according to the depth value thereof.

Figure 6:
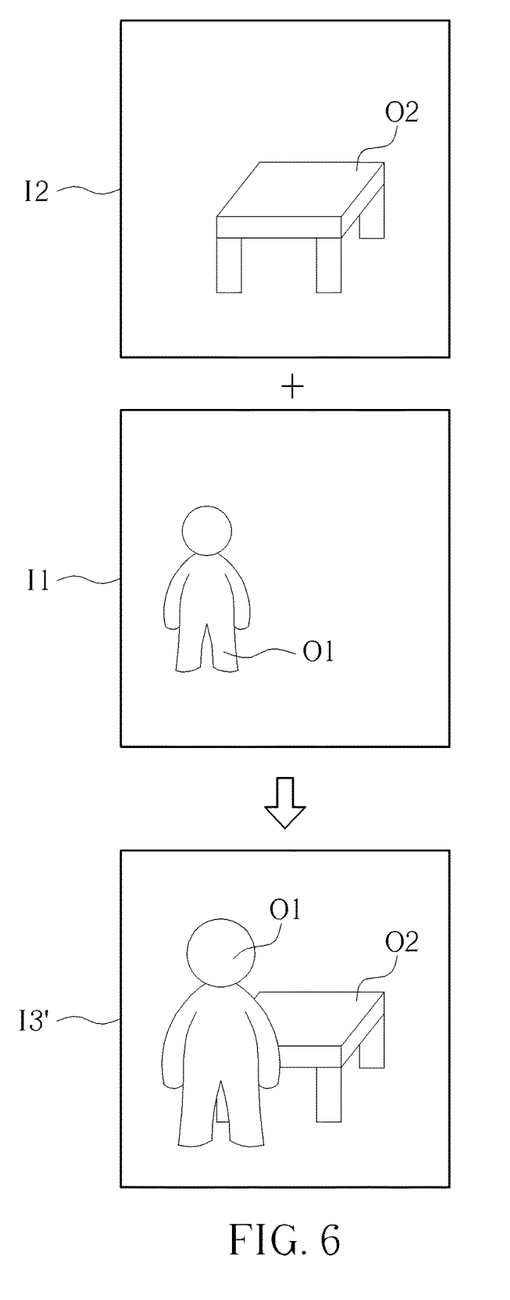

In another implementation, the maximum depth value of the second image I2 is smaller than the first object O1. In such implementation, the first object O1 is enlarged according to a relation between the depth value of the first object O1 and the maximum depth value of the second image I2. Please refer to FIG. 6, the first image I1 comprises a first object O1 with a depth value 100 cm, and the second image I2 comprises a second object O2 with a depth value 50 cm. Further, the maximum depth value for the second image I2 is 60 cm. In such case, the first object O1 is located at a location having a depth value equaling to or smaller than the maximum depth value of the second image I2. As shown in FIG. 6, the first object O1 in the altered third image I3' is located at a location with a depth value 40 cm, and the size thereof is enlarged according to the depth values for the first object O1 in the first image I1 and the altered third image I3' (i.e. 100 cm and 40 cm).

Figure 7:
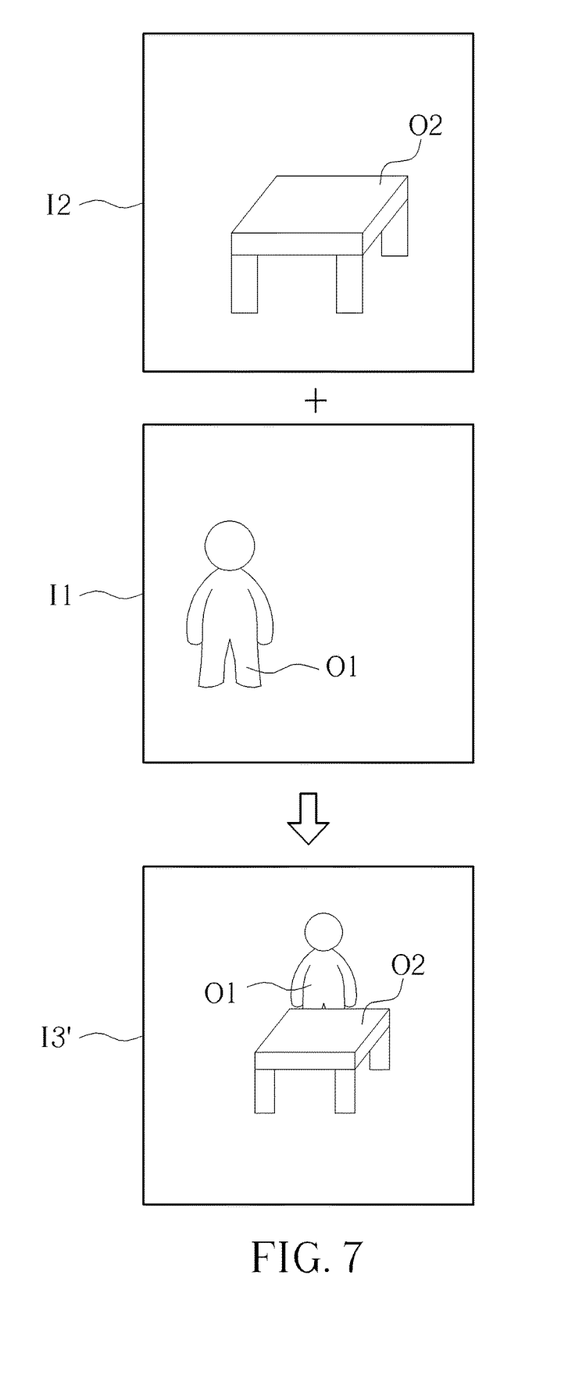

In another similar implementation, the maximum depth value of the second image I2 is also smaller than the first object O1. In such implementation, a target second object in the second image is shrunk, according to a relation between a depth value of the target second object and the depth value of the first object O1. Please refer to FIG. 7, the first image I1 comprises a first object O1 with a depth value 100 cm, and the second image I2 comprises a second object O2 with a depth value 50 cm. Further, the maximum depth value for the second image I2 is 60 cm. In such case, the second object O2 (the target second object) is shrunk according to a relation between a depth value thereof and the depth value of the first object O1 (ex. 50 cm and 100 cm). In one implementation, the first object O1 falls behind the shrunk second object O2 in the altered third image I3' since it has a depth value larger than which of the shrunk second object O2. Also, the size of the first object O1 is also shrunk based on a relation between a depth value of the second object O2 and the depth value of the first object O1, and based on the maximum depth value. By this way, the ratio between the size of the first object O1 and the size of the second object O2 can be optimized.

Figure 8:
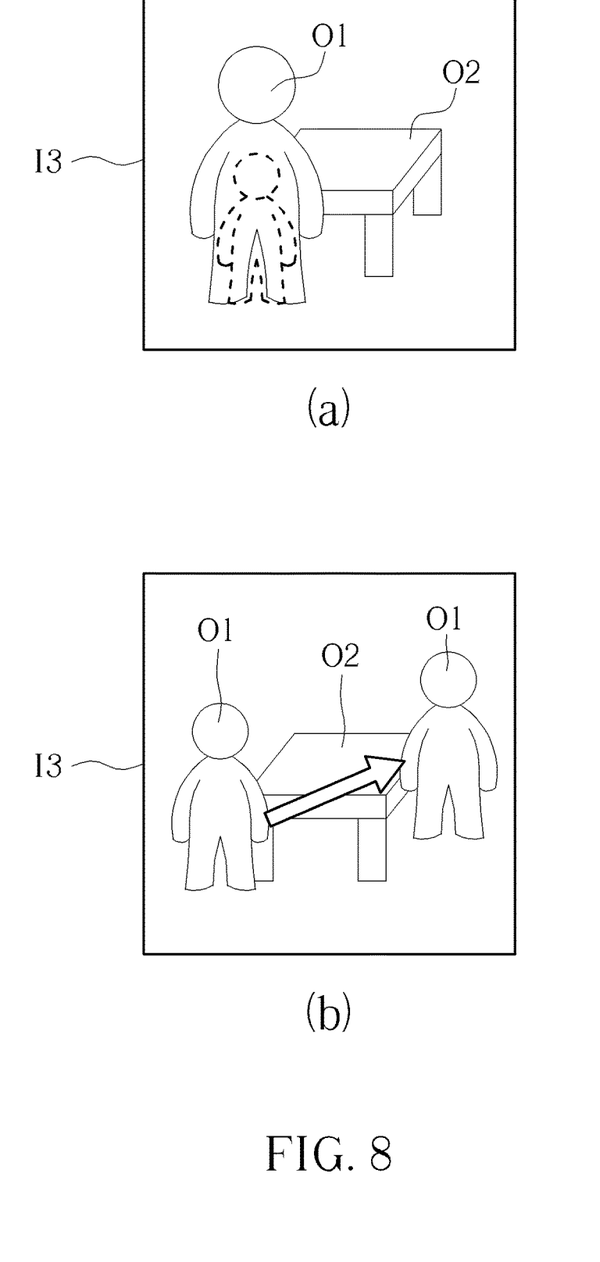

In one implementation, a lock mode and a unlock mode are provided and can be switched via a trigger operation. In the lock mode, the relation between the first object O1 and the second image I2 is fixed, thus the first object O1 is resized according to the relation between the first object O1 and the second image I2 (or an object in the second image I2). For example, the first object O1 is resized according to the depth value thereof and the depth value of the second object O2 in FIG. 4. In the unlock mode, the location and the size of the first object O1 can be altered unlimitedly. For example, in the (a) of FIG. 8, the size of the first object O1 can be manually altered by the user. Also, in the (b) of FIG. 8, the location of the first object O1 can be manually altered by the user. In the implementation of FIG. 8, the location and the size of the first object are not automatically altered.

Figure 9:
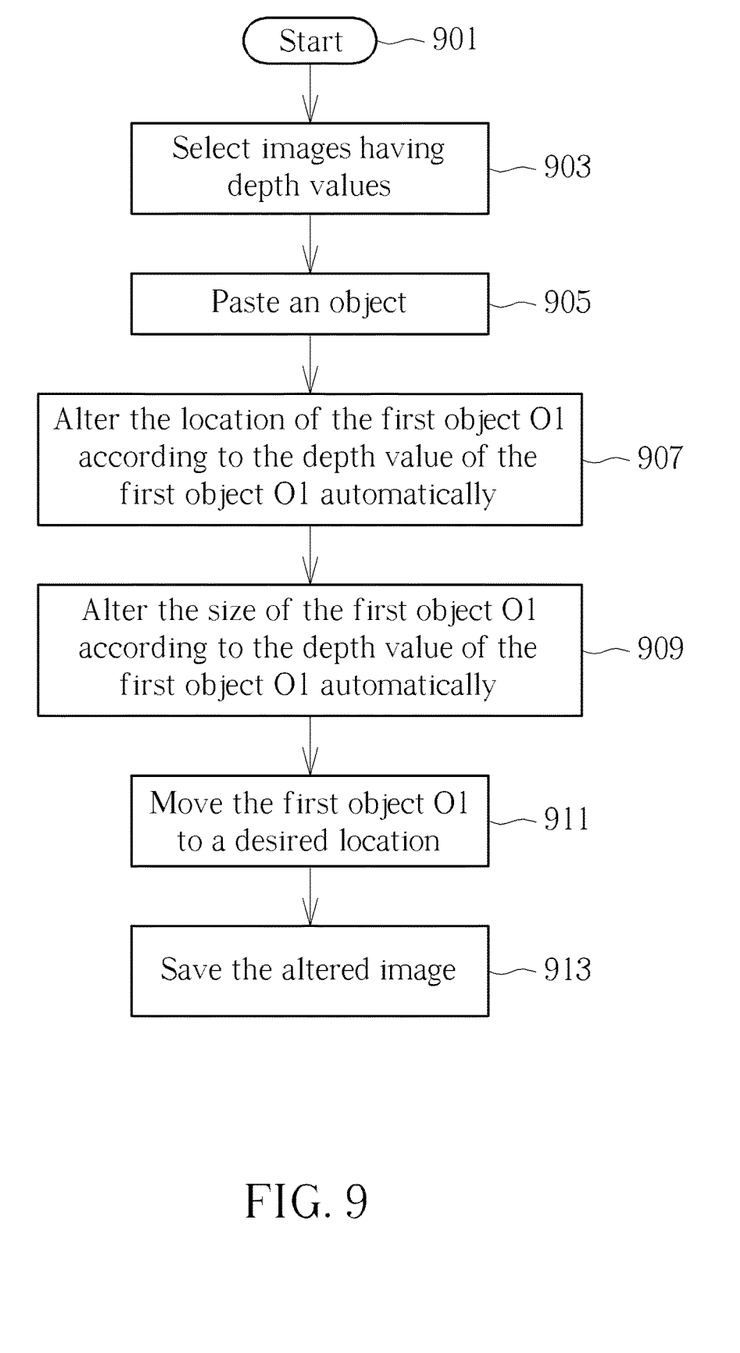
FIG. 9 is a flow chart illustrating image processing methods corresponding to the implementations depicted in FIG. 3-FIG. 7.
Figure 10:
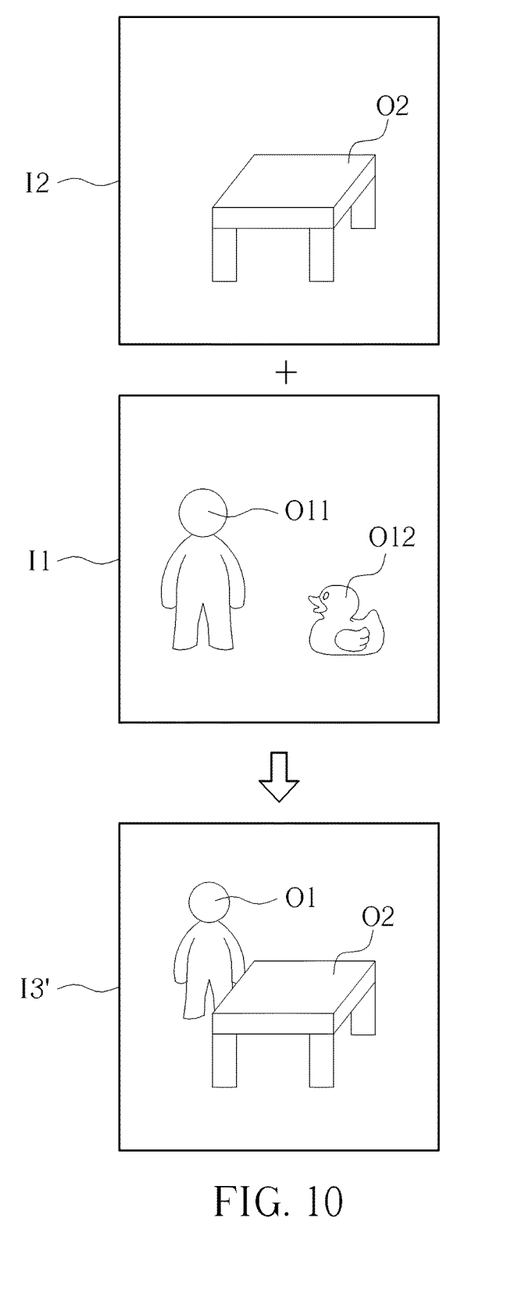
FIG. 10 is a schematic diagram illustrating an image processing method according to another implementation of the present disclosure.

FIG. 9-FIG. 10 is a flow chart illustrating image processing methods corresponding to the implementations depicted in FIG. 3-FIG. 7. Please note, these flow charts are only examples for explaining and do not mean to limit the scope of the present disclosure.

FIG. 9 is a flow chart illustrating the image processing method in the lock mode, which comprises following steps:

Step 901

Start.

Step 903

Select images having depth values. For example, the first image I1 and the second image I2 in FIG. 3.

Step 905

Paste an object. For example, as depicted in FIG. 3 and FIG. 4, paste the first object O1 onto the second image I2.

Step 907

Alter the location of the first object O1 according to the depth value of the first object O1 automatically, after the first object O1 is pasted to the second image I2.

Step 909

Alter the size of the first object O1 according to the depth value of the first object O1 automatically, after the first object O1 is pasted to the second image I2.

Step 911

Move the first object O1 to a desired location. As stated above, the first object O1 is enlarged when the first object O1 is moved to a location with a smaller depth value. Also, the first object is shrunk when the first object is moved to a location with a larger depth value.

Please note, the step 911 can be omitted in another implementation.

Step 913

Save the altered image. For example, save the altered third image I3' in FIG. 4-FIG. 7.

As above-mentioned description, an unlock mode is provided in another implementation, as depicted in FIG. 8. The unlock mode can be applied to an image without depth values, and can be applied to an image with depth values as well.

FIG. 10 is a schematic diagram illustrating an image processing method according to another implementation of the present disclosure. As depicted in FIG. 10, the first object O11 and the first object O12 in the first image I1 has a disparity value 30 cm. For more detail, the first object O11 is behind the first object O12 for 30 cm. Also, the second object O2 in the second image I2 has a depth value 50 cm. Therefore, the location of the first object O11 in the altered third image I3' is determined by the disparity value between the first object O11 and the first object O12. In one implementation, the first object O11 in the altered third image I3' has a depth value 80 cm since the second object O2 in the second image I2 has a depth value 50 cm and the first object O11 has a disparity value 30 cm. Also, the size of the object O11 in the altered third image I3' can be altered based on a relation between the depth value for the object O11 in the first image I1 and the depth value for the object O11 in the altered third image I3'.

Figure 11:
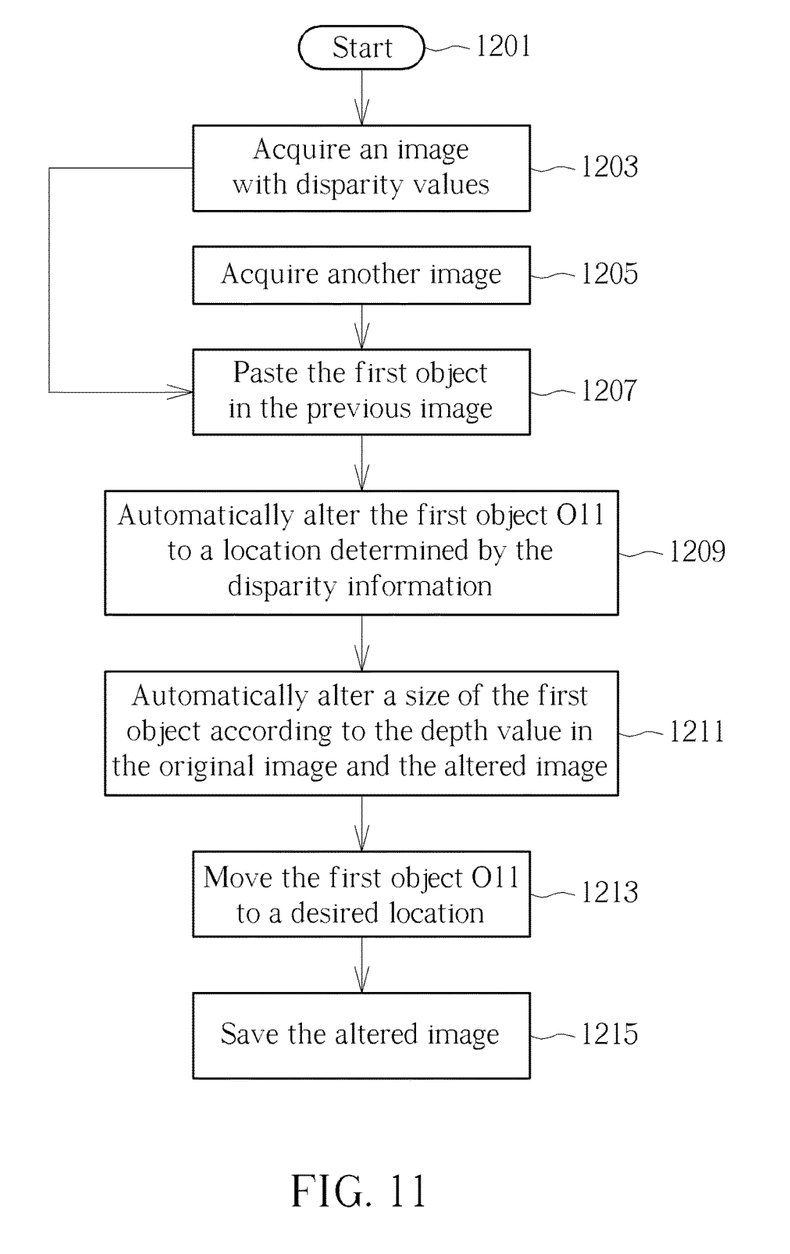
FIG. 11 is a flowchart illustrating an image processing method corresponding to the implementation depicted in FIG. 10.

FIG. 11 is a flow chart illustrating the image processing method in the lock mode, corresponding to the implementation depicted in FIG. 10. FIG. 11 comprises following steps:

Step 1201

Start.

Step 1203

Acquire an image with disparity values. For example, the first image I1 in FIG. 10.

Step 1205

Acquire another image. For example, the second image I2 in FIG. 10.

Step 1207

Paste the first object to another image. For example, paste the first object O11 to the second image I2.

Step 1209

Automatically alter the first object O11 to a location determined by the disparity information.

Step 1211

Automatically alter a size of the first object according to the depth value in the original image (ex. the first image I1) and the altered image (ex. the altered third image I3').

Step 1213

Move the first object O11 to a desired location. As stated above, the first object O11 is enlarged when the first object O1 is moved from the location stated in the step 1209 to a second location with a depth value smaller than the first depth value. Also, the first object is shrunk when the first object is moved from the location stated in the step 1209 to a third location with a depth value larger than the first depth value.

Please note, the step 1213 can be omitted in another implementation.

Step 1215

Save the altered image. For example, save the altered third image I3' in FIG. 10.

Figure 12:
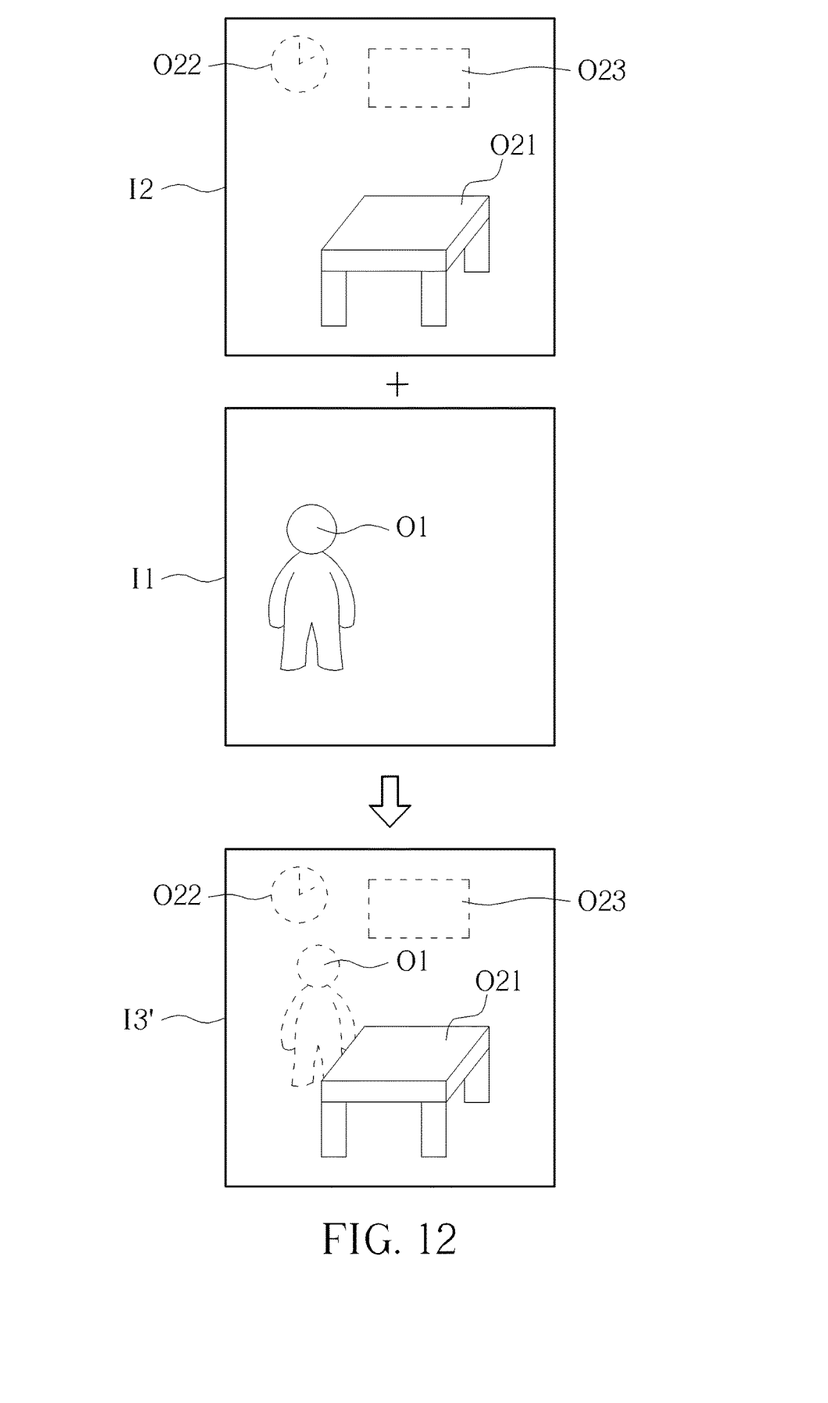
FIG. 12 is a schematic diagram illustrating an image processing method according other implementations of the present disclosure.

The image processing method provided by the present disclosure can further comprise altering other image effects besides "altering the position and size of the object". FIG. 12 is a schematic diagram illustrating an image processing method according other implementations of the present disclosure. As depicted in FIG. 12, the first object O1 in the first image I1 comprises a depth value 100 cm. Also, the second image I2 comprises a second object O21 which has a depth value 50 cm, the second objects O22 and O23 both having a depth value 100 cm. As shown in FIG. 12, the defocus level in the second image I2 is higher if the object has a larger depth value. Accordingly, if the first object O1 is pasted from the first image I1 to the second image I2, the size and the distance of the first object O1 is altered based on the depth value thereof, as above-mentioned. Also, the defocus level of the first object O1 is also altered based on the depth value thereof. For more detail, the defocus level of the first object O1 is altered to be the same as which of the second objects O22 and O23 since the depth value of the first object O1 is the same as which of the second objects O22 and O23. Please note such implementation is not limited to the case that the depth value of the first object O1 is the same as which of the second objects O22 and O23. For example, the second objects O22 and O23 both have a depth value 100 cm but the first object O1 has a depth value of 80 cm, in such case he defocus level of the first object O1 is still altered to be the same as which of the second objects O22 and O23 since the first object O1, the second objects O22 and O23 are all located outside a focus range.

Based on the implementation of FIG. 12, other image effects can be altered according to the depth value of the first object O1 as well, for example, the sharpness, the color, and the brightness. Please note, the image processing method provided by the present disclosure can only alter the image effect other than the location and the size of the first object without altering the location and the size of the first object. Accordingly, the image processing method provided by the present disclosure can be summarized as: An image processing method, comprising: (a) acquiring a first depth value for a first object in a first image; and (b) altering image effect (ex. location, size, defocus level, sharpness, color, and brightness) for the first object according the first depth value when the first object is pasted onto a second image.

Figure 13:
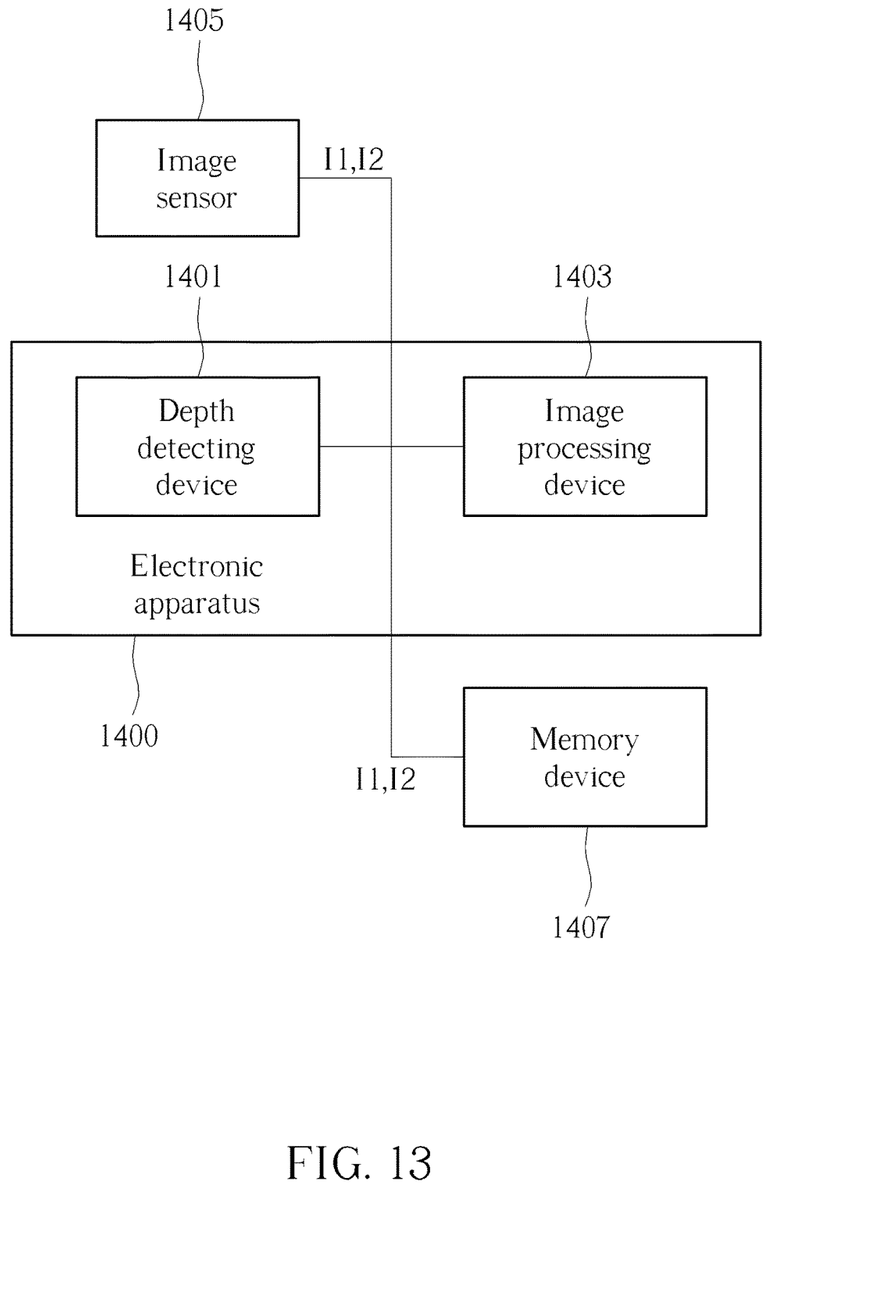
FIG. 13 is a block diagram illustrating an electronic apparatus with an image processing mechanism according to one implementation of the present disclosure.

FIG. 13 is a block diagram illustrating an electronic apparatus with an image processing mechanism according to one implementation of the present disclosure. As shown in FIG. 13, the electronic apparatus 1400 comprises a depth detecting device 1401 and an image processing device 1403. The depth detecting device 1401 is configured to acquire a first depth value for a first object in a first image I1. The image processing device 1403 is configured to alter image effect for the first object according the first depth value when the first object is pasted onto a second image I2. Please note, the first image I1 and the second image I2 can be from any image source. For example, the first image I1 and the second image I2 can be the images captured by the image sensor 1405. Also, the first image I1 and the second image I2 can be the images stored in the memory device 1407. Further, the first image I1 and the second image I2 can be the images from a website. Accordingly, the image sensor 1405 and the memory device 1407 are not limited to be included in the electronic apparatus 1400.

In view of above-mentioned implementations, the image effect of the object to be pasted can be automatically altered based on the depth value of the object to be pasted. Accordingly, the images can be merged with less disharmony. Also, optimized location and size for the object can be acquired.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image processing method, comprising:
   (a) acquiring, by a depth detecting device of an electronic apparatus, a first depth value for a first object in a first image; and
   (b) altering, by an image processing device of the electronic apparatus, an image effect for the first object according to the first depth value when the first object is pasted onto a second image.

2. The image processing method of claim 1, further comprising:
   merging, by the image processing device, the first depth value for the first object into the second image.

3. The image processing method of claim 1, wherein the step (b) further comprises:
   acquiring, by the image processing device, a location with the first depth value in the second image; and
   locating, by the image processing device, the first object at the location in the second image.

4. The image processing method of claim 3, further comprising:
   resizing, by the image processing device, the first object according to the first depth value.

5. The image processing method of claim 3, further comprising:
   enlarging, by the image processing device, the first object when the first object is moved from the location to a second location with a depth value smaller than the first depth value; and
   shrinking, by the image processing device, the first object when the first object is moved from the location to a third location with a depth value larger than the first depth value.

6. The image processing method of claim 1, wherein the step (b) further comprises:
   covering, by the image processing device, partially the first object by a second object with a depth value smaller than the first depth value in the second image.

7. The image processing method of claim 1, further comprising:
   acquiring, by the depth detecting device, a depth value for the second image; and
   if a maximum depth value of the second image is smaller than the first depth value of the first object, the image processing device enlarging a size of the first object according to a relation between the first depth value of the first object and the maximum depth of the second image.

8. The image processing method of claim 1, further comprising:
   acquiring, by the depth detecting device, a depth value for the second image; and
   if a maximum depth value of the second image is smaller than the first depth value of the first object, the image processing device shrinking a size for a target second object in the second image, according to a relation between a depth value of the target second object and the first depth value of the first object.

9. The image processing method of claim 1, wherein the altering comprises altering, by the image processing device, the image effect for the first object according to a disparity value between the first object and another object in the first image when the first object is pasted onto the second image.

10. The image processing method of claim 1, wherein the image effect comprises at least one of: a defocus level, a brightness, a sharpness, and a color.

11. An electronic apparatus with an image processing mechanism, comprising:
    a depth detecting device, configured to acquire a first depth value for a first object in a first image; and
    an image processing device, configured to alter an image effect for the first object according to the first depth value when the first object is pasted onto a second image.

12. The electronic apparatus of claim 11, wherein the image processing device merges the first depth value for the first object into the second image.

13. The electronic apparatus of claim 11,
    wherein the depth detecting device further acquires a depth value for the second image;
    wherein the image processing device alters the image effect for the first object via following steps:
      acquiring a location with the first depth value in the second image; and
      locating the first object at the location in the second image.

14. The electronic apparatus of claim 13, wherein the image processing device further resizes the first object according to the first depth value when the first object is pasted onto the second image.

15. The electronic apparatus of claim 13, wherein the image processing device further performs following steps when the first object is pasted onto the second image:
    enlarging the first object when the first object is moved from the location to a second location with a depth value smaller than the first depth value; and
    shrinking the first object when the first object is moved from the location to a third location with a depth value larger than the first depth value.

16. The electronic apparatus of claim 11, wherein the image processing device covers partially the first object by a second object with a depth value smaller than the first depth value in the second image when the first object is pasted onto the second image.

17. The electronic apparatus of claim 11,
    wherein the depth detecting device further acquires a depth value for the second image;
    wherein the image processing device further performs following steps:
      if a maximum depth value of the second image is smaller than the first depth value of the first object, enlarging the size of the first object according to a relation between the first depth value of the first object and the maximum depth value of the second image.

18. The electronic apparatus of claim 11,
    wherein the depth detecting device further acquires a depth value for the second image;
    wherein the image processing device further performs following steps:
      if a maximum depth value of the second image is smaller than the first depth value of the first object, shrinking a size for a target second object in the second image, according to a relation between a depth value of the target second object and the first depth value of the first object.

19. The electronic apparatus of claim 11, wherein the image processing device alters the image effect for the first object according to a disparity value between the first object and another object in the first image when the first object is pasted onto the second image.

20. The electronic apparatus of claim 11, wherein the image effect comprises at least one of: a defocus level, a brightness, a sharpness, and a color.

* * * * *